3,094,868
AIR DATA COMPUTER SYSTEM
Niels Yde Andersen, Jr., East Aurora, and Hiramie T. McAdams, Williamsville, N.Y., assignors, by mesne assignments, to the United States of America as represented by the Secretary of the Navy
Filed Sept. 27, 1960, Ser. No. 58,865
5 Claims. (Cl. 73—178)

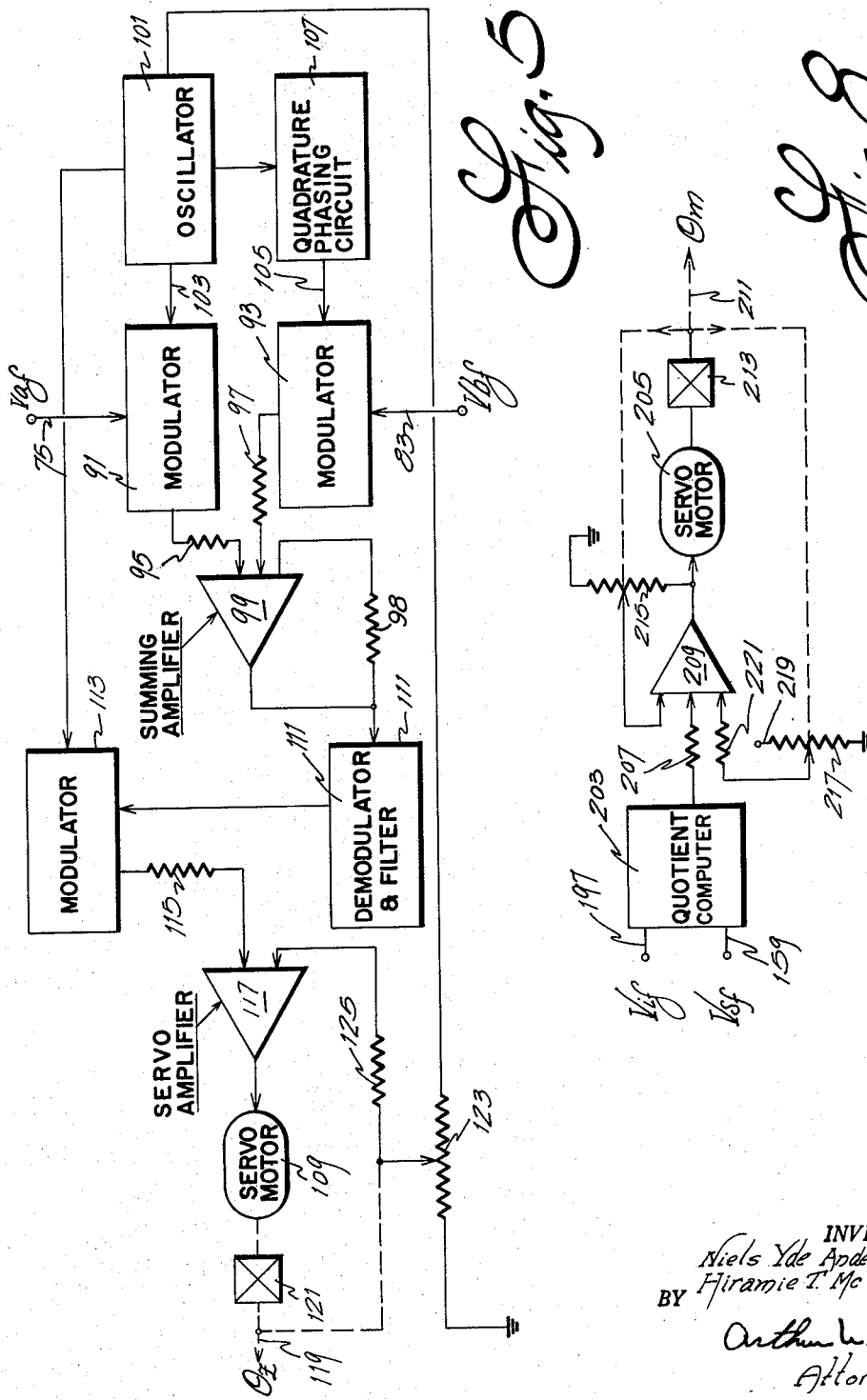

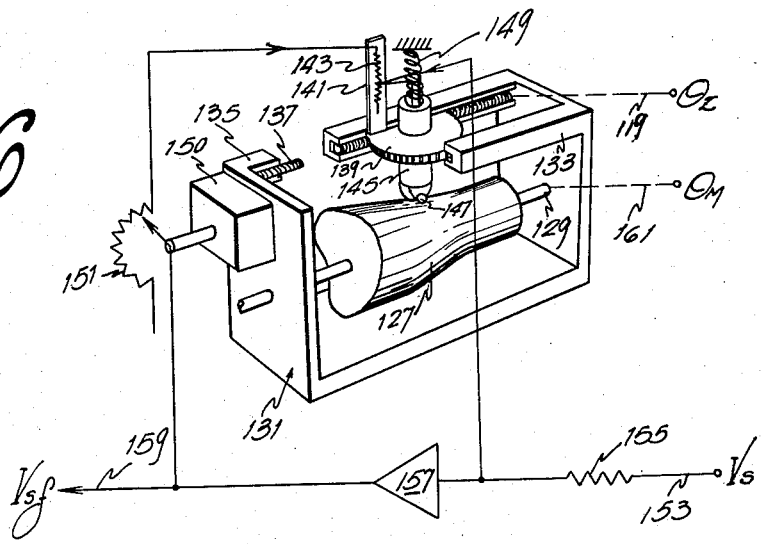
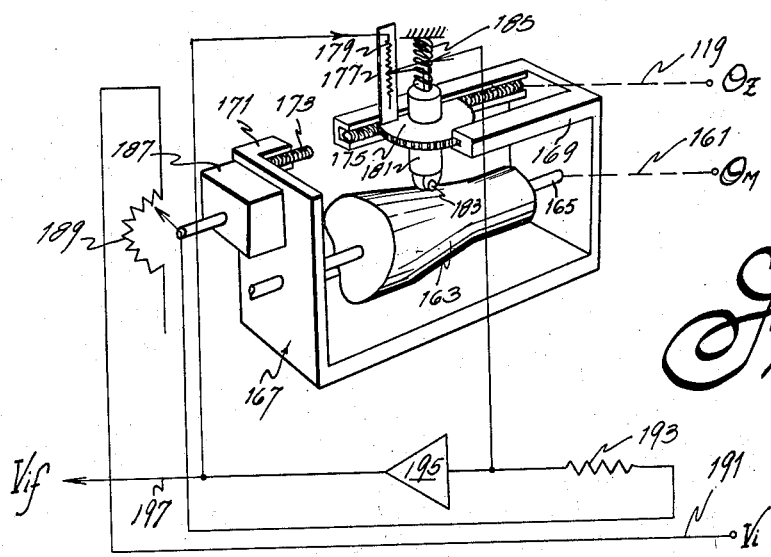

The present invention relates to a novel and improved transonic flight line computer and more particularly to a novel and improved device for an aircraft which provides an accurate and continuous measurement of free stream values of angle of attack, angle of sideslip, Mach number and static pressure.

In the flight and control of various types of transonic aircraft under various types of flight conditions it often becomes necessary and desirable to establish the free stream values of angle of attack, angle of sideslip, static pressure and Mach number of the aircraft. However, due to errors introduced by the flow field about the aircraft, the geometry of the pressure sensing element, and instrument and apparatus response limitations, considerable difficulty has been experienced heretofore in measuring these parameters with suitable accuracy from the aircraft.

It is therefore a principal object of the present invention to provide a novel and improved airborne flight line computer with which free stream parameters may be accurately and continuously determined.

It is a further object of the present invention to provide a novel and improved transonic flight line computer device wherein experimentally determined correction signals are applied to locally sensed parameters to establish the free stream values thereof.

Figure 1:
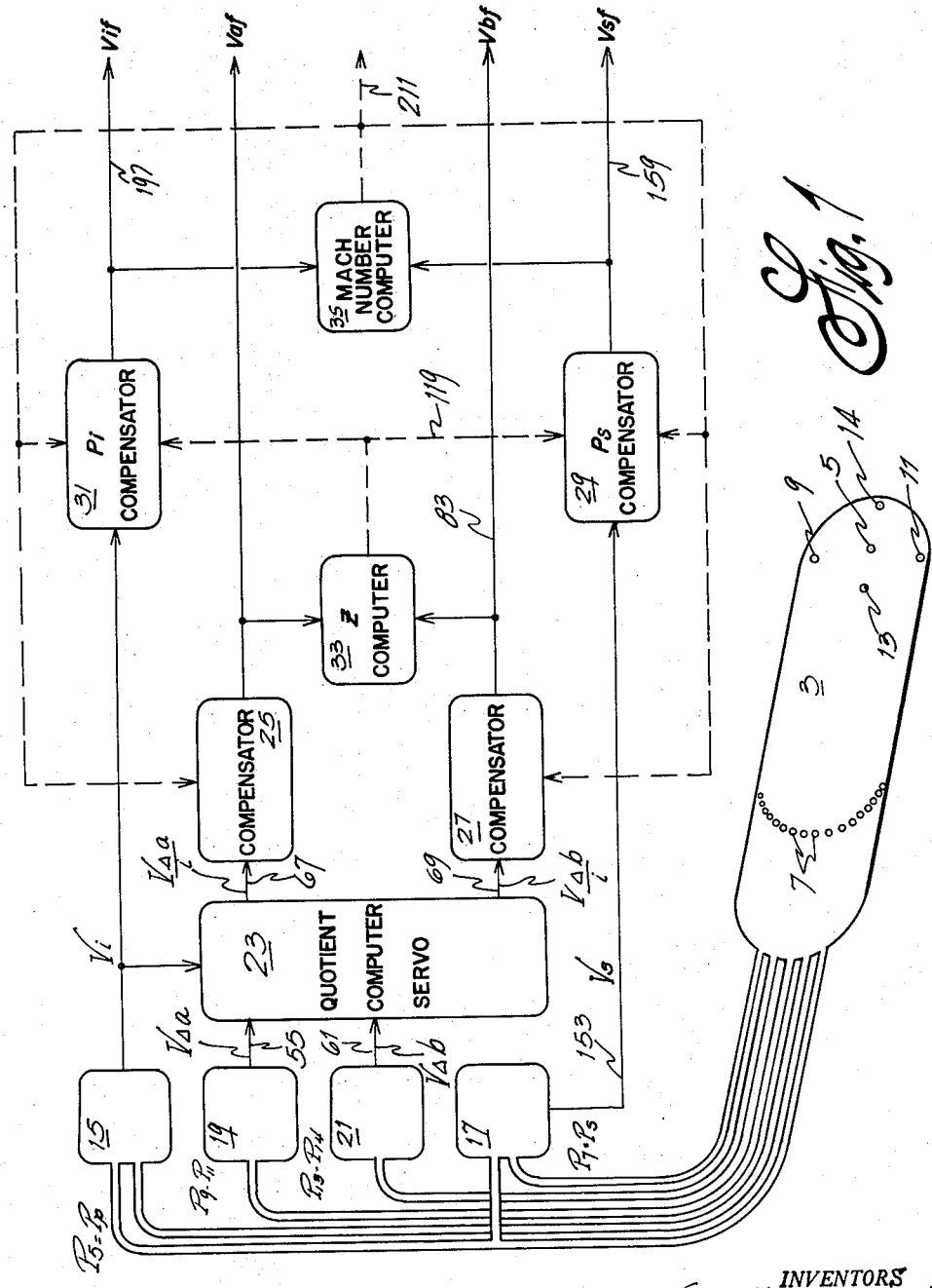
Figure 2:
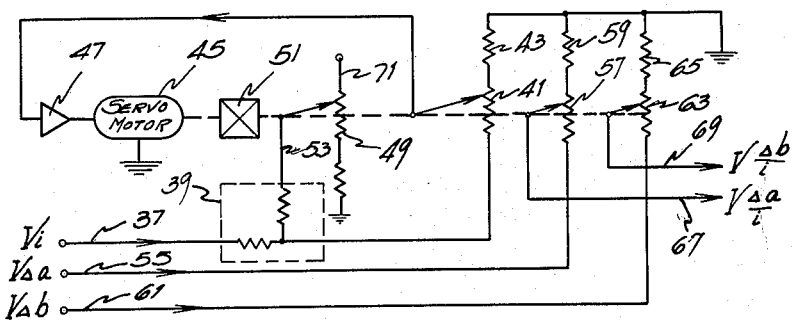
Figure 3:
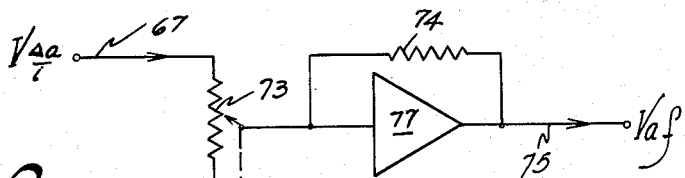
Figure 4:
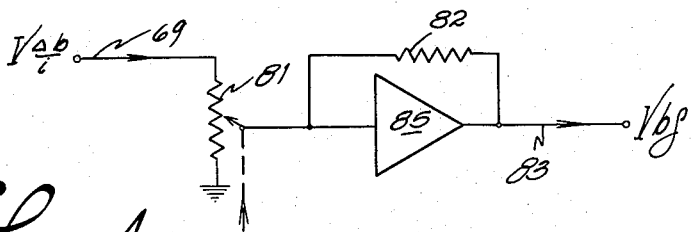

Other objects and many of the attendant advantages of this invention will be readily appreciated as the same becomes better understood by reference to the following detailed description when considered in connection with the accompanying drawings wherein:

FIGURE 1 is a system block diagram of the preferred embodiment of the present invention;
FIGURE 2 is a detailed view of the quotient computer shown in FIGURE 1;
FIGURE 3 is a detailed view of the angle of attack compensator shown in FIGURE 1;
FIGURE 4 is a detailed view of the sideslip angle compensator shown in FIGURE 1;
FIGURE 5 is a detailed view of the airstream velocity vector computer shown in FIGURE 1;
FIGURE 6 is a detailed view of the static pressure compensator shown in FIGURE 1;
FIGURE 7 is a detailed view of the impact pressure compensator shown in FIGURE 1; and
FIGURE 8 is a detailed view of the Mach number computer shown in FIGURE 1.

In general, the improved flight line computer system of the present invention includes a sensing element or pressure probe, pressure transducers, and an electromechanical computing device. The local airstream parameters are detected by the probe, transformed into electrical impulses by the transducers and converted to the desired free stream values by the application of experimentally established error correction signals derived in the computer. The necessary corrections to the local measurements to determine the free stream parameters are functions of the shape and design of the aircraft and its attached probe, the location of the probe on the aircraft, the Mach number and the aircraft angle of attack and/or sideslip.

Although theoretical determinations of the transonic flow field around the probe and the aircraft are quite complex, the desired free stream parameters and other significant parameters can be mathematically defined in a general way by the following equations:

$$A_f = f_1(M_f) V \frac{\Delta a}{i} \qquad (1)$$

$$B_f = f_2(M_f) V \frac{\Delta b}{i} \qquad (2)$$

$$Z = \sqrt{A_f^2 + B_f^2} \qquad (3)$$

$$S_f = f_3(M_f) f_1(Z) V_s \qquad (4)$$

$$i_f = f_4(M_f) f_2(Z) V_i \qquad (5)$$

$$M_f = f_5(M_f) f_6 \frac{1}{(M_f)} V \frac{i_f}{S_f} \qquad (6)$$

where:

$A_f$ is the free stream angle of attack, the angle between the fuselage reference line and the free stream velocity vector measured in the vertical plane.
$M_f$ is the free stream value of the Mach number.
$\Delta a$ is the pressure differential between the vertically disposed ports in the probe.
$i$ is the impact pressure measured by the probe.
$V$ is the signal voltage proportional to a subscript identified pressure parameter.
$B_f$ is the free stream angle of sideslip, the angle between the fuselage reference line and the free stream velocity vector measured in the horizontal plane.
$\Delta b$ is the pressure differential between the horizontally disposed ports in the probe.
$Z$ is the angle between the fuselage reference line and the free stream velocity vector.
$S_f$ is the free stream value of static pressure.
$S$ is the static pressure measured by the probe.
$i_f$ is the free stream value of impact pressure.

It has been found that the proper error correction signal for any given aircraft under given conditions of flight can be determined experimentally in order to provide data to solve Equations 1–6. It is therefore to be understood that, as the type of aircraft with which the present apparatus is employed and its conditions of flight are varied, the design, contour and/or magnitude of the hereinafter described 3-dimensional cams and impedances and the like in the computer system will also vary.

A preferred embodiment of the present invention is illustrated diagrammatically in FIG. 1 of the drawing. As shown therein, the yaw-pitch pitot-static sensing probe 3 is mounted in substantial alignment with the reference center line of the aircraft and is preferably hemispherical in contour at its outer extremity. Ports 5, 9, 11, 13 and 14 are disposed in the hemispherical nose of the probe. Ports 7 are disposed on the periphery of the cylindrical afterbody of the probe. Port 5 is centered on the reference center line of the probe and aircraft and is pneumatically connected to transducer 15. Ports 7 which are disposed about the periphery of probe 3 at a point downstream from its hemispherical nose are pneumatically connected to transducer 15 and transducer 17. Transducer 17 provides an electrical output voltage $V_s$ proportional to its input local static pressure $P_s$. Transducer 15 provides an electrical output voltage $V_i$ proportional to the difference between the locally detected pitot and static pressures $P_p$ and $P_s$. Ports 9 and 11 which are angularly disposed equidistant from the reference center line in a vertical plane are pneumatically connected to transducer 19 which provides an electrical output voltage $V \Delta a$ proportional to the differential pressure incident at ports 9 and 11. Ports 13 and 14 which are angularly disposed equidistant from the reference center line in a horizontal plane are pneumatically connected to transducer 21 which provides an electrical output voltage $V \Delta a$ proportional to the differential pressure incident at ports 13 and 14. The electrical output voltages $V \Delta a$, $V \Delta b$, and $V_i$ respectively obtained from transducers 19, 21 and 15 are fed as shown to the quotient servo computer 23. The quotient servo output voltages $$V \frac{\Delta a}{i} \text{ and } V \frac{\Delta b}{i}$$

which are obtained in a manner which will be more fully described hereinafter are then presented to the angle of attack and sideslip angle compensators 25 and 27 where they are modified by the free stream value of the Mach number and are thereby converted to compensated voltages $V_{af}$ and $V_{bf}$ respectively proportional to the free stream values of the angle of attack and angle of sideslip. The electrical voltages $V_i$ and $V_s$ respectively obtained from transducers 15 and 17 are fed to the impact and static pressure compensators 31 and 29 where they are modified by instantaneous values of the Mach number and the Z angle to provide compensated voltages $V_{if}$ and $V_{sf}$ respectively proportional to the free stream impact and static pressures. The compensated voltages $V_{af}$ and $V_{bf}$ proportional to the free stream values of angle of attack and sideslip angle are fed into the Z angle computer 33 which provides an output shaft position that represents the free stream value of Z, the angle between the fuselage reference line and the free stream velocity vector. Similarly, the compensated voltages $V_{if}$ and $V_{sf}$ proportional to the free stream values of impact and static pressures are fed into the Mach number computer 35 which provides an output shaft position that represents the free stream Mach number.

A preferred embodiment of the quotient computer 23 is illustrated in FIGURE 2 of the drawing. As shown therein, the voltage signal $V_i$ from transducer 15 is fed via conductor 37 through the mixing network 39 and through the potentiometer 41 and resistor 43 to ground. The variable arm of potentiometer 41 is electrically connected to the servo motor 45 through the servo amplifier 47. The servo motor mechanically controls the angular disposition of the variable arm of potentiometers 41 and 49 through the motor gear train system 51. The variable arm of potentiometer 49 is also electrically connected to the mixing network 39 by conductor 53. The voltage signal $V \Delta a$ from transducer 19 is fed via conductor 55 through potentiometer 57 and resistor 59 to ground. Similarly, the voltage signal $V \Delta b$ from transducer 21 is fed via conductor 61 through potentiometer 63 and resistor 65 to ground. The variable arms of potentiometers 57 and 63 are mechanically coupled to the servo motor 45 through the gear train system 51 and respectively provide output voltages $$V \frac{\Delta a}{i} \text{ and } V \frac{\Delta b}{i}$$

on conductors 67 and 69. Potentiometers 41, 49, 57 and 63 are each preferably provided with a logarithmic taper, the taper of potentiometer 49 being opposite to that of the taper of potentiometers 41, 57 and 63.

In operation, the impact signal $V_i$ from transducer 15 is fed into the mixing network 39 of the logarithmic quotient servo 23 where it is compared with the voltage at the variable arm of potentiometer 49. Inasmuch as the polarities of the voltage supply line 71 and the impact signal $V_i$ differ, the output signal from the mixing network is a difference signal which energizes potentiometer 41. The voltage at the variable arm of potentiometer 41 drives the servo motor 45 through amplifier 47 and the motor in turn adjusts the angular disposition of the gang connected variable arms of potentiometers 49, 41, 57 and 63. Thus, as the variable arm of potentiometer 49 seeks its new position the potential fed into the mixing network from potentiometer 49 nulls the network's difference output signal. The taper of potentiometer 49 being opposite to the taper of potentiometers 41, 57 and 63 provides compensation to prevent the servo loop gain from being an excessive function of the servo shaft position.

The voltages applied across potentiometers 57 and 63 are respectively directly proportional to the output signals $V \Delta a$ and $V \Delta b$ from transducers 19 and 21. The positions of variable arms of potentiometers 57 and 63 are each proportional to the impact pressure signal from transducer 15. Therefore, the output signals of the quotient computer 23 on conductors 67 and 69 are respectively proportional to the quotients $$\frac{\Delta a}{i}$$

and $$\frac{\Delta b}{i}$$

A preferred embodiment of the angle of attack compensator 25 is illustrated in FIGURE 3 of the drawing. As shown therein, the output voltage $$V \frac{\Delta a}{i}$$

is fed over conductor 67 through the potentiometer 73 to ground. The variable arm of potentiometer 73 is mechanically coupled to the Mach number computer 35 in a manner which will be more apparent hereinafter. Electrically the variable arm of potentiometer 73 is connected to the free stream angle of attack output line 75 through the amplifier circuit 77. Resistor 74 which is in parallel with amplifier 77 provides desired negative feedback to linearize amplification of the signal.

In operation the quotient signal $$V \frac{\Delta a}{i}$$

from computer 23 energizes potentiometer 73 as shown. The position of the variable arm of potentiometer 73 is mechanically adjusted and controlled in accordance with the angular movement of the output shaft of the Mach number computer 35. The electrical parameters of the circuit including the impedance of potentiometer 73 and the gain characteristic of amplifier 77 are selected so as to apply an appropriate compensation constant to account for the geometry of the aircraft and the various existent flight conditions. Thus, it will be noted that the locally sensed angle of attack voltage $V \Delta a$ is combined with the locally sensed impact pressure voltage $V_i$ in the quotient computer 23 and is further modified in compensator 25 by the free stream value of the Mach number as well as by an experimentally predetermined constant in potentiometer 73 and amplifier 77 to provide the voltage $V_{af}$ proportional to the free stream angle of attack of the aircraft.

A preferred embodiment of the sideslip angle compensator 27 is illustrated in FIGURE 4 of the drawing. As shown therein, the output voltage $$V \frac{\Delta b}{i}$$

is fed over conductor 69 through the potentiometer 81 to ground. The variable arm of potentiometer 81 is mechanically coupled to the Mach number computer 35 in a manner which will be more apparent hereinafter. Electrically the variable arm of potentiometer 81 is connected to the free stream sideslip angle output line 83 through the amplifier circuit 85. Resistor 82 which is in parallel with amplifier 85 provides desired negative feedback to linearize amplification of the signal.

In operation the quotient signal $$V \frac{\Delta b}{i}$$

from computer 23 energizes potentiometer 81 as shown. The position of the variable arm of potentiometer 81 is mechanically adjusted and controlled in accordance with movement of the output shaft of the Mach number computer 35. The electrical parameters of the circuit including the impedance of potentiometer 81 and the gain characteristic of amplifier 85 are selected so as to apply an appropriate compensation constant to account for the geometry of the aircraft and the various existent conditions of flight. Thus, it will be noted that the locally sensed sideslip angle voltage $V_{\Delta b}$ is combined with the locally sensed impact pressure voltage $V_t$ in the quotient computer 23 and is further modified in compensator 27 by the free stream value of the Mach number as well as by an experimentally predetermined constant in potentiometer 81 and amplifier 85 to provide the voltage $V_{bf}$ proportional to the free stream sideslip angle of the aircraft.

A preferred embodiment of the free stream velocity vector computer 33 is illustrated in FIGURE 5 of the drawing. As shown therein, the free stream angle of attack voltage $V_{af}$ and the free stream sideslip angle voltage $V_{bf}$ are respectively fed through conductors 75 and 83, through modulators 91 and 93 and through resistors 95 and 97 into the summing amplifier 99. The 400 cycle oscillator 101 is connected to modulator 91 through conductor 103 and to modulator 93 through conductor 105 and the quadrature phase shift circuit 107. Servo motor 109 is energized by a circuit that extends from the output of summing amplifier 99 through the demodulator and filter circuit 111, modulator 113, resistor 115, and servo amplifier 117. Resistor 98 which is equal in magnitude to the resistance of resistors 95 and 97 is connected in parallel with amplifier 99 and together with amplifier 99 provides a conventional summing effect. The armature of servo motor 109 is mechanically coupled to the output shaft 119 through gear box 121. Potentiometer 123 is electrically connected between the output circuit of oscillator 101 and ground. The variable arm of potentiometer 123 is electrically connected to servo amplifier 117 through resistor 125 and is mechanically coupled to output shaft 119 of gear box 121.

In operation the 400 cycle output signal of oscillator 101 is modulated by the free stream angle of attack voltage $V_{af}$. The 400 cycle signal of oscillator 101 is also modulated by the free stream sideslip angle voltage $V_{bf}$ after it has been shifted 90 degrees in phase by the quadrature phasing circuit 107. These 400 cycle quadrature signals $A_f \sin ut$ and $B_f \cos ut$ are then added directly in the summing amplifier 99 to produce a variable phase 400 cycle signal $kZ \sin(ut+\phi)$ which is proportional to $$\sqrt{A^2+B^2}$$

The output signal of amplifier 99 is then rectified by the full wave rectifier and filter 111 to provide a D.C. signal proportional to $kZ$. The 400 cycle signal of oscillator 101 is then modulated by this D.C. signal in modulator 113 and is fed into the 400 cycle carrier servo amplifier and motor 117 and 109. Angular movement of the armature of motor 109 is then fed through gear box 121 to the output shaft 119 which adjusts the disposition of the variable arm of potentiometer 123 and controls the nulling signal that is fed back into amplifier 117. As will be more apparent hereinafter therefore the modulator 113 and the servo mechanism coupled thereto convert the D.C. signal $kZ$ to a proportional shaft rotation to drive the followers of the three dimensional cams in compensators 29 and 31.

A preferred embodiment of the static pressure compensator 29 is illustrated in FIGURE 6 of the drawing. As shown therein, the three dimensional cam 127 is rotatably mounted on its longitudinal axis by shaft 129 which is journalled at its opposite ends between the vertically disposed sides of U-shaped member 131. The circumferential contour of cam 127 is experimentally designed so as to vary in the manner in which the locally sensed static pressure varies with changes in Mach number when Z is constant. Similarly, the peripheral contour of cam 127 along each directrix is experimentally designed so as to vary in the manner in which the locally sensed static pressure varies with changes in Z when the Mach number is constant. The elongated support members 133 and 135 which are grooved as shown on juxtaposed surfaces extend between the upright sides of U-shaped member 131. Worm gear 137 also extends between the sides of U-shaped member 131 within the groove formed in support member 135 and enmeshes with the teeth of gear 139. The rheostat support member 141 is secured to the upper surface of gear 139 and extends upwardly therefrom as shown. Rheostat 143 is affixed to support member 141 in any suitable manner. The variable arm of rheostat 143 is carried by the elongated cylindrical member 145 which is slidably disposed in the centrally located aperture through gear 139 and which engages the contour of cam 127 as at 147. The spring element or the like 149 biases the cylindrical member 145 toward its lowermost position within gear 139. Worm gear 137 is mechanically coupled through gear box 150 to the variable arm of rheostat 151 which is mounted on or secured to U-shaped member 131 in any suitable manner.

Electrically, conductor 153 from transducer 17 extends through resistor 155 and amplifier 157 to the free stream static pressure voltage output line 159. The feedback circuit for amplifier 157 extends from output line 159 through rheostat 151 and reostat 143 back to the input circuit of amplifier 157.

In operation, the inputs to the cam 127 and cam follower 145 are received on shafts 161 and 119 from the Mach number computer 35 and the Z computer 31. Cam 127 is rotated through an angle $\theta_m$ by the shaft 161 coupled to the Mach number computer 35 and the cam follower 145 is moved in a direction normal to the direction of cam rotation by means of worm gear 137 which is rotated through an angle $\theta_z$ by the shaft 119 coupled to the Z computer. Thus, the disposition of the variable arm of rheostat 143 and its effective resistance is determined by the angles of rotation $\theta_m$ and $\theta_z$ on shafts 161 and 119. Cam design is simplified by the use of the auxiliary rheostat 151 rotated by the Z computer. Thus, as $\theta_m$ and $\theta_z$ vary, the parameters and the effective gain of the feedback circuit of amplifier 157 vary and the experimentally determined correction signal is applied to convert the locally sensed value of static pressure to the desired free stream value of static pressure.

A preferred embodiment of the impact pressure compensator 31 is illustrated in FIGURE 7 of the drawing. As shown therein, the three dimensional cam 163 is rotatably mounted on its longitudinal axis by shaft 165 which is journalled at its opposite ends between the vertically disposed sides of U-shaped member 167. The circumferential contour of cam 163 is experimentally designed so as to vary in the manner in which the locally sensed impact pressure varies with changes in Mach number when Z is constant. Similarly, the peripheral contour of cam 163 along each directrix is experimentally designed so as to vary in the manner in which the locally sensed impact pressure varies with changes in Z when the Mach number is constant. The elongated support members 169 and 171 which are grooved as shown on juxtaposed surfaces extend between the upright sides of U-shaped member 167. Worm gear 173 also extends between the sides of U-shaped member 167 within the groove formed in support member 171 and enmeshes with the teeth of gear 175. The rheostat support member 177 is secured to the upper surface of gear 175 and extends upwardly therefrom as shown. Rheostat 179 is affixed to support member 177 in any suitable manner. The variable arm of rheostat 179 is carried by the elongated cylindrical member 181 which is slidably disposed in the centrally located aperture through gear 175 and which engages the contour of cam 163 as at 183. The spring element or the like 185 biases the cylindrical member 181 toward its lowermost position within gear 175. Worm gear 173 is mechanically coupled through gear box 187 to the variable arm of rheostat 189 which is mounted on or secured to U-shaped member 167 in any suitable manner.

Electrically, conductor 191 from transducer 15 extends through rheostat 189 and resistor 193 and through amplifier 195 to the free stream impact pressure voltage output line 197. The feedback circuit for amplifier 195 extends from the output line 197 through rheostat 179 back to the input circuit of amplifier 195.

In operation, the inputs to the cam 163 and cam follower 181 are received on shafts 161 and 119 from the Mach number computer 35 and the Z computer 31. Cam 163 is rotated through an angle $\theta_m$ by the shaft 161 coupled to the Mach number computer 35 and the cam follower 181 is moved in a direction normal to the direction of cam rotation by means of worm gear 173 which is rotated through an angle $\theta_z$ by the shaft 119 coupled to the Z computer. Thus, the disposition of the variable arm of rheostat 179 and its effective resistance is determined by the angles of rotation $\theta_m$ and $\theta_z$ on shafts 161 and 119. Cam design is simplified by the use of the auxiliary rheostat 189 rotated by the Z computer. Thus, as $\theta_m$ and $\theta_z$ vary the parameters and effective gain of amplifier 195 vary and the experimentally determined correction signal is applied to convert the locally sensed value of impact pressure to the desired free stream value of impact pressure.

A preferred embodiment of the Mach number computer 35 is illustrated in FIGURE 8 of the drawing. As shown therein, the free stream impact pressure voltage $V_{if}$ and the free stream static pressure voltage $V_{sf}$ are respectively fed through conductors 197 and 159 into the quotient computer 203. The specific design of computer 203 is similar to the design of the computer 23 described hereinbefore or to any other suitable conventional quotient computer. Servo motor 205 is energized by a circuit that extends from the quotient computer 203 through resistor 207 and servo amplifier 209 to the motor. Output shaft 211, the angular disposition of which follows the variations in the free stream Mach number is connected to the armature of servo motor 205 through gear box 213. The variable arm of potentiometer 215 which is connected between the output of servo amplifier 209 and ground is mechanically coupled to output shaft 211 and is electrically connected to the input of amplifier 209. The variable arm of potentiometer 217 which is connected between the power supply line 219 and ground is also mechanically coupled to output shaft 211 and is electrically connected to the input of amplifier 209 through resistor 221. Potentiometer 215 is non-linear and tapers such that its resistance increases directly in accordance with an experimentally predetermined function of the Mach number. Potentiometer 217 is also non-linear and tapers such that its resistance increases inversely in accordance with the experimentally predetermined function of the Mach number.

In operation the voltage $$V \frac{i_f}{S_f}$$

proportional to the quotient of the free stream impact pressure and the free stream static pressure is produced at the output of quotient computer 203. The servo mechanism, which includes amplifier 209 and motor 205, then converts the quotient voltage to a movement of output shaft 211 that is proportional to the free stream Mach number in the manner indicated in Equation 6 hereinabove. Thus, feedback from the output of the servo through potentiometer 215 is used to vary the gain of amplifier 209 according to the experimentally predetermined function of the Mach number, and the servo output is also converted to a voltage in potentiometer 217 which is compared with the input quotient voltage $$V \frac{i_f}{S_f}$$

to produce the error voltage operated on by the servo.

Obviously many modifications and variations of the present invention are possible in the light of the above teachings. It is therefore to be understood that within the scope of the appended claims the invention may be practiced otherwise than as specifically described.

What is claimed is.

1. In an airborne transonic flight line computer system apparatus for determining the free stream value of static pressure of an aircraft said apparatus comprising a hemispherically-ended pressure probe mounted in alignment with the reference center line of the aircraft, said probe being constructed so as to detect the local value of static pressure; a transducer which converts the locally detected value of static pressure into a proportionate electrical voltage; and a compensator which includes a three dimensional cam which applies an experimentally determined compensating correction to the locally sensed value of static pressure to obtain the free stream value of static pressure, the circumferential contour of the cam being proportional to the Mach number of the aircraft, and the contour of the cam along its longitudinal periphery being proportional to the angle between the reference center line of the aircraft and the free stream velocity vector.

2. In an airborne transonic flight line computer system apparatus for determining the free stream value of impact pressure of an aircraft said apparatus comprising a hemispherically-ended pressure probe mounted in alignment with the reference center line of the aircraft, said probe being constructed so as to detect the local value of impact pressure; a transducer which converts the locally detected value of impact pressure into a proportionate electrical voltage; and a compensator which includes a three dimensional cam which applies an experimentally determined compensating correction to the locally sensed value of impact pressure to obtain the free stream value of impact pressure, the circumferential contour of the cam being proportional to the Mach number of the aircraft, and the contour of the cam along its longitudinal periphery being proportional to the angle between the reference center line of the aircraft and the free stream velocity vector.

3. In an airborne transonic flight line computer system apparatus for determining the free stream value of Mach number of an aircraft said apparatus comprising means for determining the free stream values of impact pressure and static pressure; a circuit which provides an output voltage proportional to the quotient of the free stream values of impact pressure and static pressure; a servo mechanism connected to the output of the quotient circuit which provides the free stream value of Mach number; a first feedback circuit of the servo mechanism that varies its gain in accordance with a function of the Mach number; and a second feedback circuit of the servo mechanism that produces a voltage that is compared with the quotient voltage at the input of the servo mechanism and provides the servo error correction signal.

4. In an airborne transonic flight line computer system apparatus for determining the free stream value of the angle of attack of an aircraft said apparatus comprising a hemispherically-ended pressure probe mounted in alignment with the reference center line of the aircraft, said probe being constructed so as to detect local values of angle of attack and impact pressure of the aircraft; transducers which convert the locally detected values of angle of attack and impact pressure into proportionate electrical potentials; a first potentiometer which is energized by the angle of attack electrical potential means including a servo system controlled by the impact pressure electrical potential for positioning the variable arm of the first potentiometer; a second potentiometer which is energized by the potential produced at the variable arm of the first potentiometer; means responsive to variations in the aircraft Mach number for mechanically controlling the position of the variable arm of the second potentiometer; and means electrically coupled to the variable arm of the second potentiometer for modifying its electrical output in accordance with experimentally predetermined values unique to the contour and geometry of the aircraft.

5. In an airborne transonic flight line computer system apparatus for determining the free stream value of the sideslip of an aircraft said apparatus comprising a hemispherically-ended pressure probe mounted in alignment with the reference center line of the aircraft, said probe being constructed so as to detect local values of angle of sideslip and impact pressure of the aircraft; transducers which convert the locally detected values of angle of sideslip and impact pressure into proportionate electrical potentials; a first potentiometer which is energized by the angle of sideslip electrical potential; means including a servo system controlled by the impact pressure electrical potential for positioning the variable arm of the first potentiometer; a second potentiometer which is energized by the potential produced at the variable arm of the first potentiometer; means responsive to variations in the aircraft Mach number for mechanically controlling the position of the variable arm of the second potentiometer; and means electrically coupled to the variable arm of the second potentiometer for modifying its electrical output in accordance with experimentally predetermined values unique to the contour and geometry of the aircraft.

References Cited in the file of this patent

UNITED STATES PATENTS

| | | |
|---|---|---|
| 2,598,681 | Garbarini et al. | Jan. 3, 1952 |
| 2,761,315 | Anderson et al. | Sept. 4, 1956 |
| 2,969,910 | Reuter | Jan. 31, 1961 |
| 2,985,012 | Wail | May 23, 1961 |
| 2,985,013 | Yeager | May 23, 1961 |